United States Patent [19]
Harrison et al.

[11] Patent Number: 6,020,295
[45] Date of Patent: Feb. 1, 2000

[54] DETERGENT BUILDERS/ACTIVATORS DERIVED FROM THE OXIDATION AND ACYLATION OF POLYSACCHARIDES

[75] Inventors: Paul Richard Harrison; John Phillip Sankey, both of Warrington; Alasdair Stuart Martin, Alloway; Paul John Middleton, Warrington, all of United Kingdom

[73] Assignee: Solvay Interox Limited, Warrington, United Kingdom

[21] Appl. No.: 08/930,120

[22] PCT Filed: Apr. 24, 1996

[86] PCT No.: PCT/GB96/00968

§ 371 Date: Feb. 6, 1998

§ 102(e) Date: Feb. 6, 1998

[87] PCT Pub. No.: WO96/34934

PCT Pub. Date: Nov. 7, 1996

[30] Foreign Application Priority Data

May 6, 1995 [GB] United Kingdom .................... 9509287

[51] Int. Cl.$^7$ ................. C11D 3/22; C11D 7/18; C11D 7/54
[52] U.S. Cl. ............ 510/312; 510/376; 510/471; 510/472; 510/475; 510/476; 510/470; 510/531; 510/474
[58] Field of Search ................... 510/470, 531, 510/474, 312, 376, 471, 472, 475, 476; 252/FOR 239, FOR 240

[56] References Cited

U.S. PATENT DOCUMENTS

| | | | |
|---|---|---|---|
| 3,150,993 | 9/1964 | Hanson et al. | 106/207.4 |
| 3,655,644 | 4/1972 | Durand | 536/107 |
| 3,665,000 | 5/1972 | Hills et al. | 536/105 |
| 3,873,614 | 3/1975 | Lamberti et al. | 562/537 |
| 3,879,376 | 4/1975 | Vanlerberghe et al. | 536/20 |
| 3,901,819 | 8/1975 | Nakagawa et al. | 252/186.4 |
| 5,082,504 | 1/1992 | Leupold et al. | 134/42 |
| 5,326,864 | 7/1994 | Besemer et al. | 536/123.1 |
| 5,431,849 | 7/1995 | Damhus et al. | 510/303 |
| 5,437,810 | 8/1995 | Ewbank et al. | 510/328 |
| 5,501,814 | 3/1996 | Engelskirchen et al. | 510/471 |
| 5,541,316 | 7/1996 | Engelskirchen et al. | 510/471 |
| 5,565,556 | 10/1996 | Heinzman et al. | 536/105 |
| 5,688,757 | 11/1997 | Damhus et al. | 540/376 |

FOREIGN PATENT DOCUMENTS

| | | |
|---|---|---|
| 1 330 121 | 9/1973 | United Kingdom . |
| 1 330 122 | 9/1973 | United Kingdom . |
| 1 330 123 | 9/1973 | United Kingdom . |
| 95/15942 | 6/1995 | WIPO . |

*Primary Examiner*—Yogendra Gupta
*Assistant Examiner*—Dawn L. Garrett
*Attorney, Agent, or Firm*—Larson & Taylor

[57] ABSTRACT

Detergent builder/activators which can be produced from renewable resources are provided. The detergent builder/activators are obtainable by a process comprising subjecting a poly(saccharide) comprising a vicinal diol moiety to the independent steps of a) oxidative cleavage of a vicinal diol moiety with an oxidizing agent for vicinal diols to introduce carboxylic acid functionality, and b) acylation with an acylating agent.

28 Claims, No Drawings

DETERGENT BUILDERS/ACTIVATORS DERIVED FROM THE OXIDATION AND ACYLATION OF POLYSACCHARIDES

This invention relates to detergent builder/activators. More specifically, this invention relates to detergent builder/activators derived by the oxidation and acylation of polysaccharides.

Many detergent compositions, particularly many domestic detergent compositions, have for many years comprised a significant proportion of a detergent builder to assist in, amongst other things, the complexation of the ions responsible for water hardness. The detergent builder was commonly a phosphate, such as sodium tripolyphosphate. However, in recent times, the presence of phosphates in detergents has come under increasingly close scrutiny on account of the apparent role of phosphates in the eutrophication of water courses and consequential environmental damage.

Compounds that have been proposed as alternatives or replacements for phosphates include chelating agents such as EDTA, zeolites, and threshold agents such as poly(acrylates). Each of these alternatives, however, has its own drawbacks which mitigate against its use. For example, concerns have been expressed about the role of chelating agents in the solubilisation into water courses of potentially toxic heavy metal ions. Poly(acrylates), although of generally low toxicity, suffer from a low degree of biodegradability, leading to some concerns about their accumulation in the environment.

In addition to the concerns about detergent builders, there has also been increasing interest in the use of renewable resources in the manufacture of chemical compounds to, at least in part, reduce reliance on the petrochemical industry. In the field of detergent builders, much of this interest has focused on the use of starches as raw materials. For example, European patent application no. 0 542 496 discloses that starches can be oxidised, predominantly at the C6 position using nitric acid, sulphuric acid and a vanadium catalyst for use as a builder. European patent application no. 0 472 042 discloses that hydrolytically demolished starches and dextrins can be oxidised using hypochlorite or periodate/chlorite to produce detergent builders. Chromium (VI)-based oxidants have also been proposed for oxidising starches, see for example I Feher, Bor-Cipotech, Vol 11, 33, 65 (1961).

In addition to a detergent builder, many detergent compositions also comprise a bleaching system comprising a peroxygen oxidant and a bleach activator. The bleach activator is commonly a compound that reacts with the oxidant in use, typically at a pH of around 10, to produce an organic peracid. Many examples of such activators are known in the detergent field. Commonly the activator comprises one or more acetyl groups as in, for example, the common activators tetraacetylethylenediamine (TAED) or the acetylated sugar pentaacetyl glucose. One disadvantageous feature of conventional activators such as these is that once the peracid has been generated, the remainder of the molecule provides no additional benefit to the detergent solution.

Russian patent application no. SU 1035030 teaches that acetone-soluble cellulose acetates can be produced by first activating the cellulose by treatment with $N_2O_4$ in glacial acetic acid, followed by acetylation with acetic anhydride. There is no teaching that the product produced has either builder or activator properties. Russian patent application no. SU 1435578 teaches that water-soluble cellulose derivatives can be obtained by first methylolating cellulose, followed by treatment of the methylolated cellulose with $N_2O_4$ in dimethylsulphoxide, and then subsequent acylation with glacial acetic acid. The water-soluble celluloses are taught to be suitable for processing from solution into fibres and films. There is no teaching that the product has either builder or activator properties.

It is a first object of certain aspects of the present invention to provide a detergent builder/activator derived from a renewable resource such as a poly(saccharide).

It is a second object of further aspects of the present invention to provide a process for the production of a detergent builder/activator from a renewable resource such as a poly(saccharide).

It is third object of the present invention to provide detergent compositions comprising a detergent builder/activator derived from a renewable resource such as a poly(saccharide).

According to one aspect of the present invention, there is provided a detergent builder/activator obtainable by a process comprising subjecting a poly(saccharide) comprising a vicinal diol moiety to the independent steps of:

a) oxidative cleavage of a vicinal diol moiety with an oxidising agent for vicinal diols to introduce carboxylic acid functionality, and b) acylation with an acylating agent.

According to a second aspect of the present invention, there is provided a process for the production of a detergent builder/activator comprising subjecting a poly(saccharide) comprising a vicinal diol moiety to the independent steps of:

a) oxidative cleavage of a vicinal diol moiety with an oxidising agent for vicinal diols to introduce carboxylic acid functionality, and b) acylation with an acylating agent.

The builder/activators according to the present invention are obtained from poly(saccharides). Poly(saccharides) that can be employed in the present invention comprise 2 or more saccharides groups. Many different poly(saccharides) can be employed, but preferably the poly(saccharide) is a poly(glycoside). It will be recognised that poly(glycosides) comprise a series of linked glycosidic units. Poly(glycosides) having 2 or more linked glycosidic units can be employed as the poly(saccharide) of the present invention. Examples of poly(glycosides) that can be employed include cellulose and starches, particularly wheat starch, rice starch, maize starch and corn starch. Other poly(glycosides) that can be employed include sucrose, amylose and amylopectin, dextrins such as cyclodextrins and maltodextrins and particularly those maltodextrins comprising an average number of up to 20, preferably from 2 to 10, particularly preferably 4 to 7 glycosidic units. In many embodiments of the present invention, the poly(saccharides) comprise pyranose and/or furanose units.

The builder/activators according to the present invention are obtained by a process which comprises oxidative cleavage of a poly(saccharide) comprising a vicinal diol moiety with an oxidising agent for vicinal diols to introduce carboxylic acid functionality. A wide range of oxidising agents for vicinal diols can be employed, including halogen systems such as hypochlorite, or periodate and chlorite or peroxygen systems. When the poly(saccharide) is a poly(glycoside), it will be recognised that a glycosidic moiety comprises a number of functional groups which can be oxidised by the oxidising agent, notably the C2/C3 vicinal diol, and the C6 primary alcohol. Oxidants recognised in the art as selective oxidants for the C6 position of poly (glycosides), such as nitric acid- or $N_2O_4$-based systems are not suitable for use as oxidising agents in the present invention. An oxidising system can be employed in the present invention which, although an oxidant for the C2/C3 vicinal diol of a poly(glycoside), is not selective for oxidative cleavage at this position. An example of such a non-selective oxidising system is hypochlorite at a pH of about 4 or less, with which oxidation of the C6 position may also occur. In many embodiments, however, it is preferred that the oxidising system employed is one suitable for selective or preferential oxidative cleavage at the C2/C3 position of a poly(glycoside). Examples of oxidising systems that are suitable for oxidative cleavage selectively or preferentially at the C2/C3 position of a poly(glycoside) include hypochlorite at alkaline pH; periodate oxidation followed by a chlorite oxidation; and lead tetraacetate. Particularly when the poly(saccharide) comprises a poly(glycoside) comprising an average number of from 2 to 10 glycosidic units, one oxidising system that can be employed comprises hydrogen peroxide in the presence of an oxytungsten catalyst.

The oxidation step is usually carried out in aqueous dispersion, insoluble poly(saccharides) being in suspension, whereas soluble poly(saccharides) are in solution. The oxidation is usually carried out at ambient temperature, or only slightly above ambient temperature, for example from about 15° C. to about 35° C., preferably from about 20° C. to about 30° C., although it will be recognised that higher temperatures could be employed if desired. When an alkaline hypochlorite or peroxygen oxidant (i.e. a selective C2/C3 oxidant) is employed, the mole ratio of oxidant to poly (saccharide) (calculated as glycoside by dividing the mass of poly(saccharide) by the molecular weight of a glycoside moiety, 162) is often selected to be in the range of from 2:1 to 6:1. It will be recognised that the stoichiometric ratio of a 2 electron oxidant required to oxidise a diol to a dicarboxylic acid is 4:1. It is therefore preferred in some embodiments that the mole ratio, with the oxidant calculated as a 2 electron oxidant, is at least 4:1, and is often less than 5:1, with good results having been achieved with a mole ratio of 4.5:1. The oxidation step can also be carried out to good effect with a sub-stoichiometric amount of oxidant, for example in the mole ratio range of from 2.5:1 to 4:1. By employing a lower mole ratio, it is possible to promote the activator properties of the final product relative to the builder properties.

The weight ratio of oxidant (in the case of oxidant solutions, the weight of active oxidant in the solution) to poly(saccharide) is often selected to be in the range of from 1:1 to 5:1, with ratios in the range of from 1.5:1 to 3:1 being preferred in some embodiments. In an overlapping number of embodiments, it is preferable to employ a weight ratio of oxidant:poly(saccharide) at the lower end of the range, and particularly from 1:1 to 2:1. By selecting a comparatively high ratio of oxidant to polysaccharide within the broadest range above, the builder properties in the resultant combined builder/activator are encouraged, whereas by selecting a comparatively low ratio of oxidant to polysaccharide within the broadest range above, the activator properties in the resultant combined builder/activator are encouraged.

When the oxidation step is carried out in water, the weight ratio of water to poly(saccharide), including any water added with the oxidation system, employed in the present invention is often greater than 5:1, and more often greater than 10:1, and is often less than 30:1, and more often less than 20:1. It is advantageous when employing sodium hypochlorite to select a lower compared with a higher water content in the oxidation step, such as from 5:1 to 15:1 in that it promotes the capability of the oxidised product to function as a builder, at a selected ratio of oxidant to poly (saccharide).

The oxidant solution is preferably added to a dispersion of the poly(saccharide) and other reagents, if any, over a period of time, either incrementally or continuously. Typically, the addition period is in the range of from about 10 minutes to about 5 hours, with addition periods in the smaller scale preparation often taking at least 30 minutes and in many instances from 1 hour to 3 hours, and particularly from 1.5 hours to 2.5 hours. On a larger scale, the addition period is typically controlled by the rate at which the oxidant can be transferred into the reaction vessel and will often take from about 10 to 60 minutes.

On completion of the oxidant addition, the reaction mixture is usually stirred for a time to allow the desired amount of oxidation to take place. Reaction times are generally in the range of from several hours, such as 6 to 12 hours, to 24 hours or longer.

On completion of the desired reaction time, the oxidised polysaccharide is separated from the reaction medium. The oxidised poly(saccharide) is usually water soluble, but is generally not soluble in the presence of high concentrations of organic solvent. The oxidised poly(saccharide) is therefore commonly extracted from the reaction medium by the addition of a volatile, water miscible organic solvent such as ethanol or acetone, in an amount so as to cause the poly (saccharide) to form a precipitate. The precipitate can then be extracted by conventional means, most commonly by filtration, and can then be washed by the use of a volatile water-miscible organic solvent to remove water remaining in the product, with commonly the same solvent as used to effect the precipitation being employed. When the oxidation step precedes the acetylation step, the oxidised poly (saccharide) can be employed in the acetylation step without intermediate drying, but usually, the oxidised poly (saccharide) is dried. Commonly air drying is employed, often at elevated temperature, such as up to 100° C., with reduced pressure being employed if desired.

In addition to the oxidation step, the process by which the builder/activators according to the present invention are obtainable also comprises an acylation step. For the purposes of the description of the acylation step, the expression poly(saccharide) includes the product of an oxidation step according to the present invention. For the acylation step to be effective, the poly(saccharides) must comprise an acylatable moiety, commonly a hydroxyl group. It will therefore be recognised that the oxidation step, where this precedes the acylation step, is controlled in such a way as to ensure that an acylatable moiety or moieties remain in the poly (saccharide) after the oxidation is completed. This is of particular importance for poly(saccharides) in which only vicinal diol moieties are present. The purpose of the acylation step is to acylate at least a portion of the acylatable moieties in the poly(saccharide). The acylation step can employ a wide range of acylating agents depending, for example, on the acyl group it is desired to introduce onto the poly(saccharide). The nature of the acyl group will be determined by the nature of the peracid it is desired to produce when the builder/activator is employed in a detergent composition. For example, if it were desired to produce peracetic acid from the detergent composition, an acetylating agent would be employed, whereas to produce per-nonanoic acid, a nonanoylating agent would be employed. The acylating agent will often be selected from acid anhydrides and acid halides, particularly chlorides, with the use of acid anhydrides generally being preferred, although cost and availability may favour the use of the acid chloride in certain cases. Examples of peracids which it would be desirable to produce from the builders according to the present invention include aromatic, aliphatic and cycloaliphatic peracids, often those comprising up to 10 carbon atoms. Examples of aromatic peracids include particularly perbenzoic acid and substituted, especially para potassium sulpho substituted, perbenzoic acids. Examples of aliphatic peracids include up to C9 aliphatic peracids, particularly peracetic acid and pernonanoic acid, with the acylating agents being chosen accordingly. Particularly preferred acylating agents are acetic anhydride and nonanoyl chloride.

The conditions employed in the acylation step largely depend on the nature of the acylating agent being employed. When an anhydride is being employed, the acylation is carried out in the presence of an organic solvent, and in the substantial absence of water. The organic solvent is selected on the basis of compatibility with the anhydride employed to avoid waste in side reactions with the solvent, and on the ability to at least partially solubilise the poly(saccharide). Organic solvents include chlorinated solvents such as dichloromethane and tertiary amines such as triethylamine. A preferred solvent, particularly when acetic anhydride is employed as acylating agent, is acetic acid.

When an anhydride is being employed as acylating agent, acylation can be carried out a temperature ranging from ambient temperature, such as about 20° C. to reflux temperature. Acylation catalysts, such as $HClO_4$ may be employed if desired. The weight ratio of anhydride to poly(saccharide) is often in the range of from 1:2 to 5:1, and is preferably from 1:1 to 3:1.

In some embodiments, it is preferable to employ a high boiling point inert hydrophobic organic liquid during product recovery, in addition to any of the previously identified organic solvents, for example introduced into the recovery step in an amount of up to about 10 parts by volume per part by weight of the oxidised poly(saccharide) and in a number of instances from 2.5 to 7.5 parts vol/wt. The inert liquid is immiscible or only poorly miscible with the reaction mixture and forms a second phase. A characteristic of the liquid is to have a higher boiling point than the reaction mixture, ie the organic solvent and any residual acylating agent employed in step b). In such embodiments, the volume ratio of low boiling solvent to high boiling organic liquid is often chosen in the range of from 5:1 to 1:2. The high boiling point inert liquid usually has a boiling point of at least 120° C. and normally up to about 300° C., and in many instances from 150 to 250° C. Such hydrophobic liquids are often selected from aliphatic and aromatic hydrocarbons and particularly mixtures thereof, having the appropriate boiling point such as those obtainable as distillation cuts from crude oil. Other viable hydrophobic liquids include chlorinated derivatives of hydrocarbons having high boiling point. A particularly desirable combination of solvent/liquids comprises a mixture of from 6 to 20 volumes of acetic acid per 10 volumes of a hydrocarbon cut having a boiling point of from 150 to 250° C.

Recovery of the product of the acylation step often includes distillation or evaporation of the low boiling point solvent. The presence of the inert hydrophobic liquid during such evaporation/distillation encourages the formation of a particulate solid dispersed within the inert phase, aiding recovery of material from the reaction vessel dispersed in the inert liquid and readily separable therefrom by filtration or centrifugation techniques. Additional product can sometimes also be recovered from separated inert liquid. Where appropriate after purification steps, the inert liquid can be recycled to a subsequent batch.

When an acid chloride is employed as acylating agent, the reaction can be carried out under known conditions for the acylation of hydroxy groups. Examples of such processes include those disclosed in U.S. Pat. Nos. 4,536,314; 4,704,236; 4,908,474; and 5,380,917, each of which is incorporated herein by reference. Particularly for poorly water soluble acid chlorides such as nonanoyl chloride, acylation of the poly(saccharide) is effected first dissolving the acid chloride in a water miscible hydroxyl-free solvent prior to introduction into the reaction vessel. Suitable solvents include water miscible ketones, sulphoxides, amides, nitrides and cyclic ethers. Ketones are preferred, preferably acetone. In certain embodiments of the present invention, good results have been achieved employing a weight ratio of acid chloride to hydroxyl-free organic solvent in the range of from 2:1 to 1:2, with a weight ratio of acid chloride to poly(saccharide) of from 1:1 to 3:1.

The process according to the present invention can comprise oxidation of the poly(saccharide) prior to the acylation step, or, alternatively, the poly(saccharide) can be acylated prior to the oxidation step. However, when the poly(saccharide) is acylated prior to the oxidation, it is believed that the oxidation step can cause the loss of some of the acyl groups from the poly(saccharide), with a consequent reduction in activator performance. It is therefore usually preferred for the oxidation step to precede the acylation step.

According to a third aspect of the present invention, there are provided detergent compositions, characterised in that they comprise a peroxygen bleach and a detergent builder/activator obtainable by a process comprising the independent steps of:

a) oxidising a polysaccharide with an oxidising agent to introduce carboxylic acid functionality, and b) acylating the polysaccharide with an acylating agent.

The detergent compositions according to the present invention can be either solid or liquid detergents. The detergent compositions will be described herein with reference to solid compositions, but it will be recognised that liquid compositions will in many respects comprise similar components to the solid compositions, but that the relative amounts of these components will often vary in ways conventional in the liquid detergent art. When a liquid detergent is employed, preferred compositions are those comprising alkali metal superperborates disclosed in European patent application no. 0 565 017, incorporated herein by reference.

In many preferred solid detergent compositions according to the present invention, one or more of the composition components are selected within the following ranges (% w/w):

| builder/activator | 1 to 60%, particularly 5 to 40% |
| peroxygen bleach | 2 to 40%, particularly 5 to 30% |
| surfactant | 2 to 40%, particularly 5 to 25% |
| diluent | 0 to 70%, particularly 5 to 50% |
| additives | 1 to 10% in total. |

Peroxygen bleaches that can be included in the detergent compositions according to the present invention include perborate salts, percarbonate salts, and permono and perdisulphate salts. In many cases, the peroxygen bleaching agent will be selected from sodium percarbonate, sodium perborate monohydrate and sodium perborate tetrahydrate.

The surfactants for incorporation in solid compositions of the present invention can be selected from particulate or flaky anionic, cationic, non-ionic, zwitterionic, amphoteric and ampholytic surfactants and can be either natural soaps or synthetic. A number of suitable surfactants are described in chapter 2 of Synthetic Detergents by A Davidsohn and B M Milwidsky (6th edition) published in 1978 by George Godwin Ltd and John Wiley & Sons, incorporated herein by reference. Without limiting to these surfactants, representative sub-classes of anionic surfactants are carboxylic acid soaps, alkyl aryl sulphonates, olefin sulphonates, linear alkane sulphonates, hydroxy-alkane sulphonates, long chain and OXO alcohol sulphates, sulphated glycerides, sulphated ethers, sulphosuccinates, alkane sulphonates, phosphate esters, sucrose esters and anionic fluorosurfactants; representative classes of cationic surfactants include quaternary ammonium or quaternary pyridinium salts containing at least one hydrophobic alkyl or aralkyl group, representative classes of nonionic surfactants include condensates of a long chain alkanol with either polyethylene oxides or with phenols, or condensates of long chain carboxylic acids or amines or amides with polyethylene oxide, and related compounds in which the long chain moiety is condensed with an aliphatic polyol such as sorbitol or condensation products of ethylene and propylene oxides or fatty acid alkanolamides and fatty acid amine oxides; representative classes of amphoteric/zwitterionic surfactants include sulphonium and phosphonium surfactants, optionally substituted by an anionic solubilising group. The proportion of surfactant, expressed as a fraction of all the surfactant present is often from $2/10$ to $8/10$ths anionic, from 0 to $9/10$ths nonionic, and from 0 to $3/10$ths for the other surfactants.

In addition to the detergent builder/activators according to the present invention, the detergent compositions can comprise an additional builder selected from amongst those which are conventional or contemplated in the art. Examples of such additional builders include specifically alkali metal phosphates, particularly tripolyphosphate but also tetrapyrophosphate and hexametaphosphate, especially the sodium salt of each, alkali metal, preferably, sodium carbonate, alkali metal, preferably, sodium borates, and siliceous builders including clays like bentonite, zeolites such as X, Y and MAP zeolites (EP-A-0 552 053) and layered silicates such as the product available under the trade designation SKS6. When such an additional builder is employed, it is usually present in the composition at a lower concentration than that at which they are conventionally employed in the absence of the builder/activators according to the present inventor. Useful detergent compositions can also include organic chelating builders include nitrilotrisodium triacetate (NTA), EDTA, EDTMP and DTPMP. Such chelating builders can be employed in a relatively small amount as an augmenting builder and peroxygen stabiliser, such as of 1 to 10%.

The detergent compositions can also contain diluents, in an amount usually of not more than about 70% w/w. Such diluents include sodium and magnesium sulphate and are less favoured than previously by manufacturers of detergent compositions, who in recent years have promoted concentrated compositions.

Detergent compositions of the present invention can also contain other substances selected for dedicated purposes in detergent compositions, which in some instances are referred to collectively as detergent additives. Among such additives, the following can be mentioned: additional persalt activators, optical brighteners, foam inhibitors, enzymes, fading inhibitors and anti-redeposition agents, colorants, pH regulators. Such additives for incorporation in persalt-containing detergent compositions have been described in greater detail in Chapter 4 and exemplified in Chapter 7 of the aforementioned work by Davidsohn and Milwidsky and are well known to skilled practitioners. Thus, for example, the additional bleach activator is typically a compound which generates a peroxyacid or an anion thereof by reaction with a peroxygen and is employed in a mole ratio of about 4:1 to 1:2 peroxygen:activator for monoactivating activators and proportionately for multiactivating activators. The range of activators a1 to a20 described by Solvay Interox Ltd in EP-A 0 565 017 can be employed herein, including TAED, SNOBS, sodium isononoyloxybenzenesulphonate, TAGU or sugar esters. Another type of additional activator for washing/bleaching compositions comprises certain transition metal salts and/or complexes, for example certain manganese, cobalt, and titanium complexes, sometimes employed in conjunction with a calcium promoter, as described in European Patent Application-A-0 272 030. Commonly used optical brighteners include stilbene derivatives. Common antiredeposition agents include carboxymethyl cellulose and polyvinyl pyrrolidone.

In a variation on detergent compositions, there are also provided bleach additive compositions, which comprise peroxygen bleaches and detergent builder/activators according to the present invention. Such bleach additive compositions are often employed to augment the cleaning properties of non-bleach containing detergent systems, and so are generally free from, or contain below 2% w/w, surfactants, although other components of detergent compositions may be present. The bleach additive compositions often comprise up to 75% w/w, preferably up to 55% w/w, peroxygen bleach and up to 75% w/w, preferably up to 55% w/w, builder/activator.

The washing and/or bleaching compositions can be employed for washing and or bleaching operations, such as for domestic laundry in accordance with currently described operation conditions for respectively persalt or persalt plus activator-containing compositions.

In certain embodiments of the present invention, the detergent builder/activators can be present in detergent compositions comprising an inorganic peroxygen compound at least in part as a coating for the peroxygen compound. The use of such a coated peroxygen compound is believed to be particularly desirable when the peroxygen compound comprises sodium percarbonate. Such use is believed to offer not only the advantages of detergency building and bleach activation, but also to enhance the stability of the peroxygen. When a coated peroxygen compound is employed, the coating is often up to about 10% by weight, usually less than 5% by weight, and often greater than about 2% by weight, of the coated peroxygen. The detergent builder/activator according to the present invention may be employed either as the sole coating agent, or as one component in a mixture of coating agents.

According to a preferred aspect of the present invention, there is provided a detergent builder/activator obtainable by a process comprising:

a) in a first step, oxidatively cleaving a poly(glycoside) at the C2/C3 vicinal diol to introduce carboxylic acid functionality with an alkaline solution of sodium hypochlorite, the mole ratio of hypochlorite to poly (glycoside), calculated as glycoside, being from 2:1 to 6 to 1, and b) in a second step, acetylating the oxidised poly (glycoside) from a) with acetic anhydride, the weight ratio of acetic anhydride:oxidised poly(glycoside) being from 1:1 to 3:1.

Having described the invention in general terms, specific embodiments thereof are described in greater detail by way of example only.

In the Examples, the following general methods were followed, unless otherwise specified.

Oxidation Step 10 g of poly(saccharide) was dispersed in 100 g demineralised water at room temperature (20 to 25° C.). 200 ml of 10% w/v sodium hypochlorite solution was added with stirring to this dispersion over a period of 2 hours.

On completion of the addition, the reaction mixture was stirred for 24 hours at room temperature. The reaction mixture was then cooled to 5° C. and then poured into 1.5 to 2 times the volume of reaction mixture of cold (5° C.) methanol. This mixture was then filtered to extract the solid oxidised poly(saccharide), and the solid washed with cold methanol. The product is then vacuum dried.

Acetylation Step 12 g of dry poly(saccharide) is added with stirring to a mixture of 20 g acetic anhydride and 110 g acetic acid. The reaction mixture is then heated to reflux temperature, and held at this temperature for 2 hours. After this period, the reaction mixture is allowed to cool to room temperature. The solid obtained is extracted by filtration, washed with ethyl acetate and air dried.

Builder Performance

The ability of the oxidised poly(saccharides) to sequester calcium and magnesium ions was measured by potentiometric titration. A millivolt meter fitted with a divalent cation selective electrode and calomel reference electrode was calibrated by noting the potential against a range of standard calcium or magnesium ion solutions ($10^{-5}$ to $10^{-3}$ M), in the presence of 0.001M NaOH, and a calibration graph produced. A sample (0.1 g) of the oxidised poly(saccharide) is then dissolved in 100 mls 0.001M NaOH solution. Aliquots of 0.1M Mg or Ca solution are then added, and the potential noted. For the addition of a given amount of Mg or Ca ions, the concentration of non-sequestered Mg or Ca ions in the solution can be calculated from the calibration graph, giving by subtraction the amount of ions sequestered. The results are expressed as a percentage of ions sequestered, and are quoted for the addition of 2 g or 5 g of Mg or Ca per 100 g of oxidised poly(saccharide).

Bleach Activator Performance

The bleach activator performance was measured by dissolving a 3.8 g sample of acylated product in the presence of 22.8 g sodium perborate monohydrate in demineralised water at 25° C. and pH 9 with agitation provided by a paddle stirrer. Aliquots of the solution were removed at regular intervals after the addition of the sample and analysed for peracid by iodometric titration in ice/water/glacial acetic acid with sodium thiosulphate solution.

EXAMPLE 1

A sample of unmodified wheat starch commercially available from Sigma Chemicals was oxidised by the general method given above, except that 15 g of starch was employed, with the other reagent quantities being scaled proportionately, yielding 9.1 g oxidised product. Analysis by $^{13}C$ NMR showed peaks at 170 to 180 ppm relative to dioxane which were attributed to carboxyl carbons. The oxidised starch was found to sequester 69% Ca at 2 g Ca per 100 g oxidised starch and 50% Ca at 5 g Ca per 100 g oxidised starch.

6 g of the oxidised starch was acetylated by the general method given above, with other reagent quantities reduced proportionately, yielding 2.4 g acetylated product. Analysis of the product by IR showed a peak at 1740 $cm^{-1}$ which was attributed to the presence of acetate groups. Analysis by $^1H$ NMR showed peaks at 1.8 to 2.4 ppm relative to TMS which were attributed to the presence of acetate groups. Analysis by $^{13}C$ solution NMR showed peaks at 165 to 180 ppm relative to dioxane which were attributed to the presence of carboxyl groups. $^{13}C$ solid state NMR relative to tetramethylsilane showed a peak at 171 ppm which was attributed to the presence of carboxylic acid groups, and peaks at 21.1 ppm and 14.3 ppm which were respectively attributed to the presence of methyl moieties of acetate groups.

EXAMPLE 2

A sample of unmodified wheat starch commercially available from Sigma Chemicals was oxidised and subsequently acetylated by the general methods given above.

Evaluation of the activator performance showed that 16.9 mg/l per 1.5 g sample of peracetic acid had been produced 3 minutes after addition of the sample.

EXAMPLE 3

A sample of rice starch commercially available from Sigma Chemicals was oxidised and subsequently acetylated by the by the general methods given above.

Evaluation of the activator performance showed that 12.6 mg/l per 1.5 g sample of peracetic acid had been produced 1 minute after addition of the sample.

EXAMPLE 4

A sample of cellulose powder commercially available from Aldrich Chemicals was oxidised and subsequently acetylated by the by the general methods given above.

Evaluation of the activator performance showed that 63.4 mg/l per 1.5 g sample of peracetic acid was present in solution 5 and 10 minutes after addition of the sample.

Comparison C5

The builder and bleach activator performances of the wheat starch employed in Examples 1 and 2 were measured. No calcium sequestration was observed, and no peracetic acid was produced.

EXAMPLE 6

A sample of unpurified wheat starch commercially available from Sigma Chemicals was oxidised by the general method given above, except that 10.19 g of starch was suspended in 177 ml water and 83 mls of sodium hypochlorite solution (17.9% conc) was introduced, yielding 9.0 g oxidised product. The oxidised starch was found to sequester 50% Ca at 5.2 g Ca per 100 g oxidised starch.

5.07 g of the oxidised starch was acetylated by the general method given above, with other reagent quantities altered proportionately, yielding 1.74 g acetylated product. Evaluation of the activator performance showed that 8.4 mg/l per 1.5 g sample of peracetic acid was present in solution 5 minutes after addition of the sample.

EXAMPLE 7

The procedure of Example 6 was followed, except that the starch (10.07 g) was dispersed in only 20 ml water. The same volume/strength of sodium hypochlorite solution was used, providing the same ratio of active chlorine to starch as in Example 6, but in the presence of a lower amount of water, during the reaction, yielding 9.2 g oxidised product. The oxidised starch was found to sequester 62% Ca at 5.2 g Ca per 100 g oxidised starch. Evaluation of the activator performance showed that 10.8 mg/l per 1.5 g sample of peracetic acid was present in solution 5 minutes after addition of the sample.

EXAMPLE 8

The procedure of Example 7 was followed, except that only 56 mls of the same strength sodium hypochlorite solution was used, providing ⅔rds the ratio of active chlorine to starch as in Example 7, yielding 9.7 g oxidised product. The oxidised starch was found to sequester 33% Ca at 5.2 g Ca per 100 g oxidised starch, indicating that even at a very low ratio of oxidant:starch, a product having significant calcium exchange capability is obtainable when the oxidant solution contains only a relatively small amount of water.

Evaluation of the activator performance showed that 13.6 mg/l per 1.5 g sample of peracetic acid was present in solution 5 minutes after addition of the sample.

EXAMPLE 9

In this Example, the process was carried out on approximately a 40× scale. In step 2, oxidised starch (500 g, obtained by a scaled up repetition of Example 6) was mixed with acetic anhydride (937.5 g) in solution in 4375 g acetic acid, and the mixture stirred at reflux temperature (120° C.) for 2 hours. A commercial high boiling petroleum cut available under trade mark SHELLSOL AB (5 liters, bp 170° C.) was introduced into the reaction mixture, and acetic acid was removed under vacuum, by which time the temperature of the mixture had fallen to 60° C. The mixture was then permitted to cool overnight and the solids dispersed in the petroleum cut were filtered, washed with ethyl acetate, refiltered and dried under vacuum. 608 g product was recovered.

Evaluation of the activator performance showed that 4.8 mg/l per 1.5 g sample of peracetic acid was present in solution 5 minutes after addition of the sample.

What is claimed is:

1. A detergent builder/activator obtained by a process comprising subjecting a poly(saccharide) having at least one vicinal diol moiety and having in addition, at least one acylatable moiety to the steps of:
   a) first, oxidative cleavage of the vicinal diol moiety with an oxidizing agent for vicinal diols to introduce carboxylic acid functionality, the oxidizing agent being in a quantity such that the weight ratio of oxidizing agent to poly(saccharide) is from 1:1 to 5:1, in order to obtain an oxidized poly(saccharide) comprising carboxylic acid groups and still containing at least one acylatable moiety; and then
   b) acylation of the acylatable moiety of the oxidized poly(saccharide) into an ester group with an acylating agent chosen from acid anhydrides and acid halides, the weight ratio of acylating agent to poly(saccharide) being from 1:2 to 5:1 in the case of an acid anhydride and from 1:1 to 3:1 in the case of an acid halide.

2. A process for the production of a detergent builder/activator comprising subjecting a poly(saccharide) having a vicinal diol moiety and having in addition, at least one acylatable moiety to the steps of:
   a. first, oxidative cleavage of the vicinal diol moiety with an oxidising agent for vicinal diols to introduce carboxylic acid functionality, the oxidizing agent being in a quantity such that the weight ratio of oxidizing agent to poly(saccharide) is from 1:1 to 5:1, in order to obtain an oxidized poly(saccharide) comprising carboxylic acid groups and still containing at least one acylatable moiety; and then
   b. acylation of the acylatable moiety of the oxidized poly(saccharide) into an ester group with an acylating agent chosen from acid anhydrides and acid halides, the weight ratio of acylating agent to poly(saccharide) being from 1:2 to 5:1 in the case of an acid anhydride and from 1:1 to 3:1 in the case of an acid halide.

3. A detergent builder/activator according to claim 1, wherein the poly(saccharide) comprises a poly(glycoside).

4. A detergent builder/activator according to claim 3, wherein the poly(glycoside) is selected from the group consisting of starches and maltodextrins.

5. A detergent builder/activator according to claim 1, wherein the acylating agent comprises acetic anhydride or nonanoyl chloride.

6. A detergent builder/activator according to claim 1, wherein the acylation step is conducted in the presence of acetic acid as solvent for the acylating agent.

7. A detergent builder/activator according to claim 1, wherein, after the acylation step, a high boiling point inert hydrophobic liquid is mixed with the reaction mixture containing acylated oxidized poly(saccharide), and lower boiling solvent is then evaporated or distilled from the mixture, thereby producing a dispersion of acylated oxidized poly(saccharide) in the hydrophobic liquid.

8. A detergent builder/activator according to claim 1, wherein the poly(saccharide) comprises a poly(glycoside) and wherein the oxidizing agent is selected from alkaline sodium hypochlorite and hydrogen peroxide.

9. A detergent builder/activator according to claim 8, wherein the mole ratio of sodium hypochlorite or hydrogen peroxide to poly(saccharide), calculated as glycoside, is from 2:1 to 6:1.

10. A detergent builder/activator accordingly to claim 1, wherein the oxidizing agent comprises alkaline sodium hypochlorite, and wherein the weight ratio of sodium hypochlorite to poly(saccharide), calculated as glycoside, is from 1:1 to 2:1.

11. A detergent builder/activator according to claim 3, wherein the weight ratio of water:poly(glycoside) in step a) is in the range of from 5:1 to 15:1.

12. A detergent builder/activator according to claim 3, wherein the oxidizing agent is introduced into a suspension of poly(glycoside) in water of from 1:1 to 1:3 parts wt:volume.

13. A detergent or bleach activator composition, comprising a peroxygen bleach and a detergent builder/activator obtainable by a process comprising the independent steps of:
   a) oxidising a polysaccharide with an oxidising agent to introduce carboxylic acid functionality, and
   b) acylating the polysaccharide with an acylating agent.

14. A detergent builder/activator obtained by a process comprising:
   a) in a first step, oxidatively cleaving a poly(glycoside) at the C2/C3 vicinal diol to introduce carboxylic acid functionality with an alkaline solution of sodium hypochlorite, the mole ratio of hypochlorite to poly (glycoside), calculated as glycoside, being from 2:1 to 6:1, and
   b) in a second step, acetylating the oxidised poly (glycoside) from step a) with acetic anhydride, the weight ratio of acetic anhydride:oxidised poly (glycoside) being from 1:1 to 3:1.

15. A process for the production of a detergent builder/activator comprising
   a) in a first step, subjecting a poly(glycoside), to oxidative cleavage at the C2/C3 vicinal diol to introduce carboxylic acid functionality with an alkaline solution of sodium hypochlorite, the mole ratio of hypochlorite to poly(glycoside), calculated as glycoside, being from 2:1 to 6:1, and
   b) in a second step, acetylating the oxidised poly (glycoside) from step a) with acetic anhydride, the weight ratio of acetic anhydride:oxidised poly(glycoside) being from 1:1 to 3:1.

16. A detergent or bleach activator composition characterised in that it comprises a detergent builder/activator according to any one of claims 1, 3, 4, 5, 6, 12, 14, or 17.

17. A detergent builder/activator according to claim 1 wherein said acylatable moiety comprises a hydroxyl group.

18. A process according to claim 2, wherein the poly(saccharide) comprises a poly(glycoside).

19. A process according to claim 18, wherein the poly(glycoside) is selected from the group consisting of starches and maltodextrins.

20. A process according to claim 2, wherein the acylating agent comprises acetic anhydride or nonanoyl chloride.

21. A process according to claim 2, wherein the acylation step is conducted in the presence of acetic acid as solvent for the acylating agent.

22. A process according to claim 2, wherein, after the acylation step, high boiling point inert hydrophobic liquid is mixed with the reaction mixture containing acylated oxidized poly(saccharide), and lower boiling solvent is then evaporated or distilled from the mixture, thereby producing a dispersion of acylated oxidized poly(saccharide) in the hydrophobic liquid.

23. A process according to claim 2, wherein the poly(saccharide) comprises a poly(glycoside) and wherein the oxidizing agent is selected from alkaline sodium hypochlorite and hydrogen peroxide.

24. A process according to claim 23, wherein the mole ratio of sodium hypochlorite or hydrogen peroxide to poly(saccharide), calculated as glycoside, is from 2:1 to 6:1.

25. A process accordingly to claim 2, wherein the oxidizing agent comprises alkaline sodium hypochlorite, and wherein the weight ratio of sodium hypochlorite to poly(saccharide), calculated as glycoside, is from 1:1 to 2:1.

26. A process according to claim 18, wherein the weight ratio of water:poly(glycoside) in step a) is in the range of from 5:1 to 15:1.

27. A process according to claim 18, wherein the oxidizing agent is introduced into a suspension of poly(glycoside) in water of from 1:1 to 1:3 parts wt:volume.

28. A process according to claim 2 wherein said acylatable moiety comprises a hydroxyl group.

* * * * *